(No Model.)
T. F. BOURNE.
EXTENSION CRANK.
No. 524,522. Patented Aug. 14, 1894.
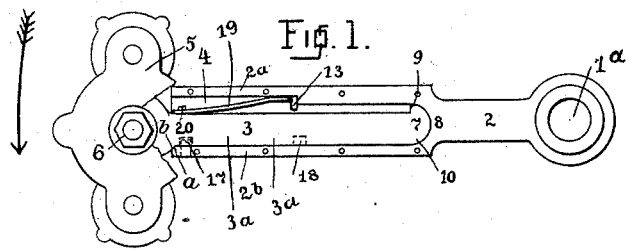
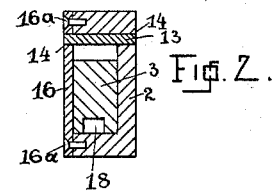
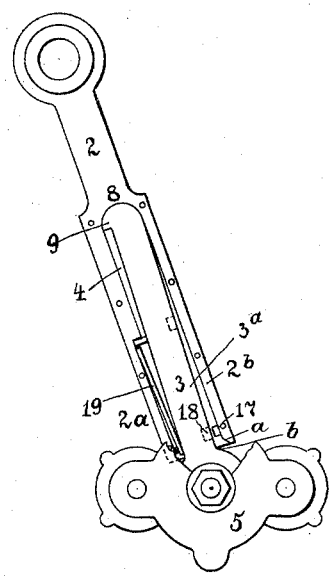
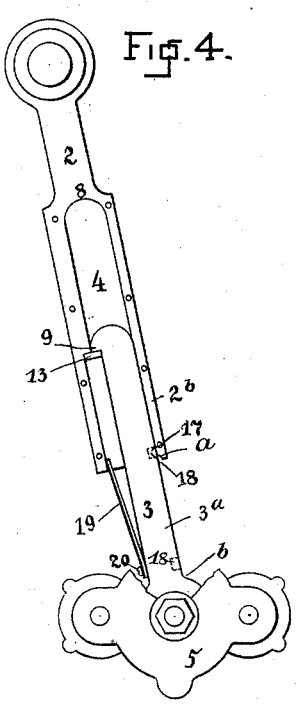
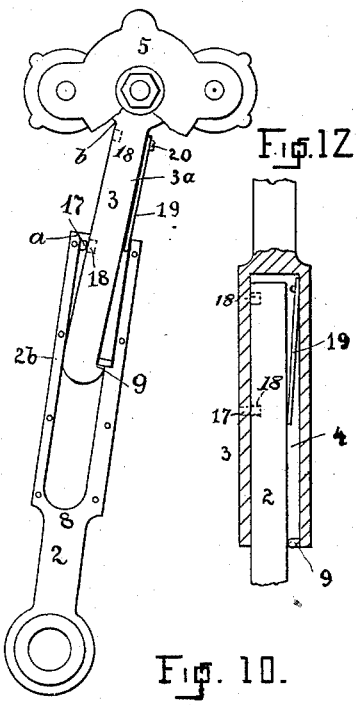
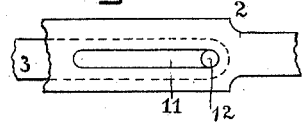
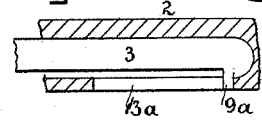
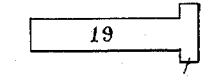
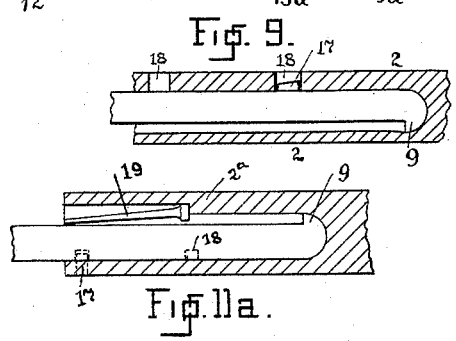
WITNESSES:
INVENTOR.
T. F. Bourne

UNITED STATES PATENT OFFICE.

THEODORE F. BOURNE, OF EDGEWATER, NEW YORK.

EXTENSION-CRANK.

SPECIFICATION forming part of Letters Patent No. 524,522, dated August 14, 1894.

Application filed April 14, 1894. Serial No. 507,506. (No model.)

*To all whom it may concern:*

Be it known that I, THEODORE F. BOURNE, a citizen of the United States, residing in the village of Edgewater, county of Richmond, and State of New York, have invented certain new and useful Improvements in Extension-Cranks, of which the following is a specification.

My invention pertains to cranks more particularly used in treadle mechanisms, such for instance as in the driving mechanism of bicycles, tricycles or similar vehicles and it has for its object to permit the crank to be extended from its normal length or condition, and then shortened, and vice versa, at the will of the user or rider.

The invention consists in a crank or lever comprised in two parts, one part extensible on the other, and a lock to hold said parts together, one of said parts having lateral motion relatively to the other to enable the parts to be unlocked to permit one part to be moved longitudinally of the other.

The invention also consists in a crank or lever made extensible or in two parts, one part being adapted to slide longitudinally of the other, one of said parts having a pin or projection to enter one or more corresponding recesses in the other part to hold said parts from longitudinal movement relatively to each other, a spring to hold said pin or projection in said recess, one of the parts of said crank having lateral movement relatively to the other part to disengage said pin from said recess or socket to permit one part to move longitudinally of the other.

The invention also consists in the combination of the above mentioned parts with a spring arranged to normally hold said pin or projection in said recess, and yet allow said parts to move to release said pin or projection from the corresponding registering recess.

The invention further consists in the novel details of improvement and the combination of parts that will be more fully hereinafter set forth and then pointed out in the claims.

Reference is to be had to the accompanying drawings, forming part hereof, wherein—

Figure 1 is a partly broken side view of my improved crank, in the horizontal or driving position, one side of the crank being removed to show the mechanism. Fig. 2 is a cross section thereof, on the plane of the line 2—2 in Fig. 1. Fig. 3 is a side view similar to Fig. 1 of the crank in its normal or short condition, but in position to be lengthened. Fig. 4 is a corresponding view, showing the crank lengthened. Fig. 5 is a similar view, but showing the crank in position for shortening. Fig. 6 is a detail of a modification. Fig. 7 is a detail of a stop. Figs. 8 and 9 are details of modifications. Figs. 10 and 11 are details of springs. Fig. 11$^a$ is a detail view showing the application of the spring illustrated in Fig. 11. Fig. 12 is a detail of another modification.

In the following description it will be assumed that the crank drives in the direction of the arrow in Fig. 1, while in Figs. 3, 4 and 5 the crank is in the reverse position, or rising.

In the accompanying drawings, in which similar numerals and letters of reference indicate corresponding parts in the several views, the numeral 1 indicates the crank, which is made extensible, that is to say, is made in two parts one movable longitudinally of the other.

The part 2 of the crank is shown provided with an aperture 1$^a$ to receive a suitable shaft to which it may be locked or keyed in any desired or well known manner, the part 3 of the crank being carried by the part 2, and movable longitudinally thereof.

The part 2 of the crank is shown provided with a longitudinal bore or recess 4 extending from the outer end inwardly a suitable distance, and the part 3 of the crank enters said bore 4 and slides freely therein.

In Fig. 2, the part 3 of the crank is shown rectangular in cross section and the bore 4 is correspondingly shaped, whereby the part 3 is kept from turning in the part 2 under the influence of the torsional strain that is put upon the part 3, when pressure is applied to the pedal 5, whose shaft 6 is suitably secured to the sliding part 3 of the crank. But of course the parts 2 and 3 of the crank may have any other suitable cross section, or be otherwise suitably arranged, to prevent one part from turning in or on the other on its longitudinal axis, as by a spline or feather for instance, between said parts.

The inner end 7 of the part 3 of the crank, normally rests, when said part is pushed in, against the bottom 8, of the bore or recess 4 in part 2 of the crank, as in Figs. 1 and 3, whereby part of the down thrust in pedaling or driving, is borne by the solid part of the part 2. The end 7 of the part 3 and the bottom 8 of bore 4 are shown rounded, whereby the part 2 may have a pivotal action in the bore 4. The inner edge of the wall $2^b$, of part 2, at the outer end is shown curved at $a$, to engage a correspondingly curved web $b$, on the part 3 of the crank, when the parts 2 and 3 are in the shortened position, as in Fig. 1. By this means the web $b$, bears on the end of part 2, and takes up part of the down thrust of the pedal. The forward or outer part of the bore or recess 4 in part 2 of the crank is shown wider or deeper than the corresponding or contiguous portion of the part 3 of the crank, whereby said part 3 may have a certain amount of lateral movement, at its outer portion, within the bore 4, as clearly shown in Figs. 3 and 5, but of course the bore 4 could be wider than the part 3 throughout its entire length for the same purpose, if preferred.

The inner portion of the part 3 of the crank, at its ends 7, is widened or provided with a toe or projection 9, that rides against one side or wall $2^a$ of the bore 4 in part 2 of the crank. This toe or projection 9, therefore, in conjunction with the opposite side 10 of the part 3, acts as a pivotal point for the part 3 to permit it to turn or move laterally at its outer part, while at the same time preventing lateral movement of the end 7 of the sliding part 3 of the crank, as clearly shown in the drawings, Figs. 1 to 5.

It is evident that a pivotal action can be allowed the inner end of part 3 of the crank otherwise than as above explained. Suitable means for this purpose is shown in Fig. 6, wherein the side wall or walls of part 2 of the crank may be provided with a slot or slots 11, in which a pin 12, carried by the part 3 of the crank, works. The pin 12 and slot 11 may also act to limit the longitudinal movement of the sliding part 3 in the part 2 of the crank.

In Figs. 1 to 5 I have shown a stop 13 located in the bore or recess 4 of part 2 of the crank, that lies in the path of the enlargement, toe or projection 9 of the sliding part 3 of the crank, so that when the toe or projection 9, in its forward movement, strikes the stop 13 it will limit the outward or forward movement of the part 3. The stop 13 may be made integral with the part 2 in the process of manufacture, but I find it convenient to make said stop in the form of a cross bar having its ends located in recesses 14 in the sides of the part 2, as in Fig. 2. While the stop 13 may be held in place by riveting I find it convenient to provide said stop with an offset 15 that rests against the inner walls of the bore 4 to prevent said stop from slipping out of the apertures 14, as in Fig. 7.

Instead of using the toe 9 and stop 13, as shown, to limit the forward movement of the sliding part 2 of the crank, I may provide the parts 2 and 3 with a pin or screw and slot, as in Fig. 8, wherein the part 2 on one side is provided with a slot $13^a$ that receives a pin, screw or projection $9^a$ on the sliding part 2 of the crank, or vice versa, whereby the pin or projection $9^a$ will strike the metal at the end of the slot $13^a$ to limit the forward movement of part 2. But other suitable devices may be used for this purpose.

For convenience of manufacture I have shown the bore 4 in the form of a channel or groove in one side of the part 2 of the crank, and provided with a plate or side cover 16 that may be riveted on the part 2 or fastened by screws $16^a$ as shown in Fig. 2. The side or plate 16 may be readily removed when it is desired to adjust or clean the parts within the bore 4 of the part 2 of the crank. But it will be understood that the parts 2 and 3 of the crank may be placed together in any suitable manner to permit one part to slide longitudinally of the other, and yet prevent rotation or turning of one part within the other, and the plate 16 may have a recess 14, to receive the stop 13, as shown in Fig. 2.

In order to lock the parts 2 and 3 together, so that they will be firm to resist the driving power, and yet permit them to be unlocked when desired I have shown the part 2 of the crank as provided with or carrying a pin or projection 17 that enters a corresponding recess or socket 18 in the part 3, see Figs. 1 to 5. There are two or more sockets or recesses 18 in part 3, corresponding in distance apart to the sliding movement allowed the part 3 so that when the pin 17 is in one recess 18 the crank will be in its short or normal position, and when the pin 17 is in the other recess 18 the part 3 of the crank will be in its lengthened or extended position. (See Figs. 1 and 3 for the short or normal position of the crank, and Figs. 4 and 5 for the lengthened or extended position thereof.)

In Fig. 9 I have shown the pin 17 as carried by the sliding part 3 and the recesses or sockets 18 in the wall of the part 2.

In order to normally keep the pin or projection 17 in a recess or socket 18, I have provided a spring 19 to hold the part 3 normally against the wall $2^b$ of part 2 of the crank. Said spring 19 is shown located within the forward or widened part of the bore 4 in the part 2 of the crank, which spring bears against the sliding part 3 of the crank, and against the wall $2^a$, of the part 2 of the crank, as shown. By preference I secure the spring 19 to the sliding part 3 of the crank, as by a rivet, screw or the like 20, or by other suitable means, and thereby cause the free end of said spring 19 to bear with suitable force against the wall $2^a$ so as to normally hold one side of the sliding part 3 of the crank against the wall $2^b$ of the part 2 of the crank, and to thus hold the pin 17 in a recess 18, as shown in Figs. 1 and 4. This is the normal driving position of the parts, and as shown in Fig. 1 the side 3ª of the sliding part 3 of the crank exerts pressure against the wall 2ᵇ of the part 2 of the crank, while the toe or projection 9 on the part 3 of the crank bears against the wall 2ª of the part 2 of the crank, whereby the inner end of part 3 is held from tilting within the bore 4. Pressure now exerted on the pedal 5 in the direction of the arrow in Fig. 1 binds the parts 2, 3, together, and the pin 17 being normally in the socket 18 prevents the part 3 from sliding. The spring 19 should be of such a tension or strength as to resist the normal weight or pressure of the rider's foot, when the crank is on the up-stroke, so that the pin 17 will normally remain in the socket 18. Therefore with the above described arrangement the parts will under normal conditions remain in the positions shown either in Fig. 1 or Fig. 4, or in the shortened or lengthened condition.

When it is desired to lengthen the crank the latter is allowed to descend to its lowest position and when it has commenced to rise on the up-stroke, extra downward pressure is exerted by the rider or user on the pedal 5, sufficiently to overcome the resistance of the spring 19, whereupon the sliding part 3 of the crank will be tilted in the bore of the part 2 of the crank, so as to release the pin 17 from the socket 18, and then the sliding part 3 of the crank, under the influence of the downward pressure of the pedal, will be caused to slide outwardly or downwardly from the position shown in Fig. 3 to that shown in Fig. 4, the toe or projection 9 thereupon encountering the stop 13, to limit the outward movement of the part 3 of the crank. The pin 17 and the socket 18 will now be in line, and as the downward pressure on the pedal 5 is decreased the spring 19 will press back the part 3 of the crank, and thus cause the pin 17 to enter the corresponding socket 18, whereupon the parts 2 and 3 of the crank will be locked in their extended positions as shown in Fig. 4. The crank can now be used in its lengthened or extended position to develop greater power on its axis. It will be understood that when the crank is in the vertical position, a downward pressure on the pedal will not release the pin 17 from a socket 18, and that this can only be done when the crank has risen on the up-stroke to a suitable angle, such as substantially shown in Fig. 3, and that the angle at which the pin 17 will be disengaged from the socket 18 is regulated somewhat by the strength of the spring 19.

When it is desired to shorten the crank from the position shown in Fig. 4 to that shown in Fig. 1, the rider or user waits until the crank has risen on the up-stroke to an angle above a horizontal plane, and considerably near the vertical, or substantially as shown in Fig. 5. Downward pressure on the pedal 5 when the crank has reached the proper upper angle, will cause the sliding part 3 of the crank to tilt backward to release the pin 17 from the corresponding socket 18, whereupon the said downward pressure on the pedal will cause the part 3 to slide inwardly until it abuts against the bottom 8 of the bore 4, whereupon the spring 19 will press the part 3 of the crank against the wall 2ᵇ of the part 2 to cause the pin 17 to enter the corresponding socket 18 as in Fig. 1. From the foregoing it will be understood that the crank can continuously rotate in either the shortened or extended condition, and that the rider can lengthen or shorten the crank when desired by merely exerting sufficient force on the pedal 5, when the crank has arrived at the proper angle, to overcome the normal resistance of the spring 19, and release the lock.

In Fig. 10 the spring 19 is shown in the form of a flat spring or plate, which may be suitably shaped and bent, and provided with an aperture 19ª, to receive the rivet or screw 20, but it is evident that the spring 19, can be secured to the wall 2ª, of the part 2 of the crank, so that the part 3 of the crank can slide against said spring. Such an arrangement is shown in Fig. 11ª. In case the spring 19 is secured to the part 2 of the crank, I preferably form said spring as shown in Fig. 11, and provide it with ears 13 that enter the sockets or apertures 14 in the wall of the part 2 of the crank, and in the plate or cover 16, as shown in Fig. 2. In this case the back part of the spring 19 acts as a stop 13 to limit the forward or outward motion of the sliding part 3 of the crank.

Instead of providing the part 2 of the crank with the bore 4 I may provide the part 3 with said bore so that it can receive and slide on the part 2, as shown in Fig. 12, the pin 17, socket 18 and spring 19 being arranged substantially as and for the purposes before specified. In this case the toe or projection 9 would be carried by and with the bore 4, of the sliding part 3 to enable the necessary pivotal action between parts 2 and 3, to release the pin 17 from its socket 18 to take place.

Having now described my invention, what I claim is—

1. A crank or lever comprised in two parts, one part extensible on the other and adapted to have lateral motion relatively to the other, and a lock for holding said parts together and arranged to be unlocked by the lateral movement of one of said parts, substantially as described.

2. A crank or lever made in two parts, one part being extensible on the other, one of said parts adapted to have lateral movement relatively to the other, a lock to hold said parts together, and a spring to act with said lock and against the lateral movement of one of said parts of said crank, substantially as described.

3. A crank or lever made in two parts, one part extensible on the other, one of said parts adapted to have lateral movement relatively to the other, a pin or projection rigidly carried by one of said parts, the other part having a recess or socket to receive said pin or projection, and a spring to hold said pin or projection in said recess or socket and to act against the lateral movement of one of said parts, substantially as described.

4. A crank or lever made in two parts, one part having a rectangular bore to receive the other part, the latter part being rectangular in cross section, a pin or projection carried by one part to enter a recess or socket in the other part and a spring to hold said pin or projection in said recess or socket, one of said parts adapted to have lateral motion relatively to the other to permit said pin to be withdrawn from said recess or socket, substantially as described.

5. A crank or lever made in two parts, one part having a bore opening at its outer end to receive the other part, said bore being wide enough to permit said other part to have lateral motion, a lock for holding said parts together, and a spring to act with said lock and against the lateral motion of said movable part of the crank, substantially as described.

6. A crank or lever made in two parts, one part having a bore, the other part being a sliding bar in said bore, a stop within said bore, a toe or projection on the sliding bar near its inner end to ride against the wall of the other part, said bore being wide enough in one direction to permit the sliding bar to have a pivotal motion within said bore, a pin or projection carried by one of said parts to enter a recess or socket in the other part, and a spring carried by the sliding part near its outer end to hold said pin in said recess or socket, substantially as described.

7. A crank or lever made in two parts, one part extensible on the other, the sliding part having a web to bear against the end of the other part to limit the inward movement of said sliding part, means for locking the parts of the crank in two positions, one of said parts having lateral movement relatively to the other to permit said part to slide longitudinally of the other, substantially as described.

8. A crank or lever made in two parts, one part having a longitudinal bore to receive the other part, a stop composed of a cross bar having its ends located in sockets in the walls of said bore, a projection on the sliding part of the crank to engage said stop, a lock to hold said parts of the crank together, and a spring to hold said parts in their locked position, substantially as described.

9. A crank comprised in two parts, one part having a bore, the other part being a sliding bar located in said bore, said bore being wider in one direction than said sliding bar, a stop carried by the part having the bore, a toe or projection on the sliding part to engage said stop, a spring carried by said sliding part and bearing against the other part, and a pin or projection carried by one of said parts to enter a recess or socket in the other part, said pin or projection and the recess or socket being located on the driving side of said crank, substantially as described.

THEODORE F. BOURNE.

Witnesses:
E. M. FORD,
ARTHUR THAYER.